Patented Oct. 28, 1952

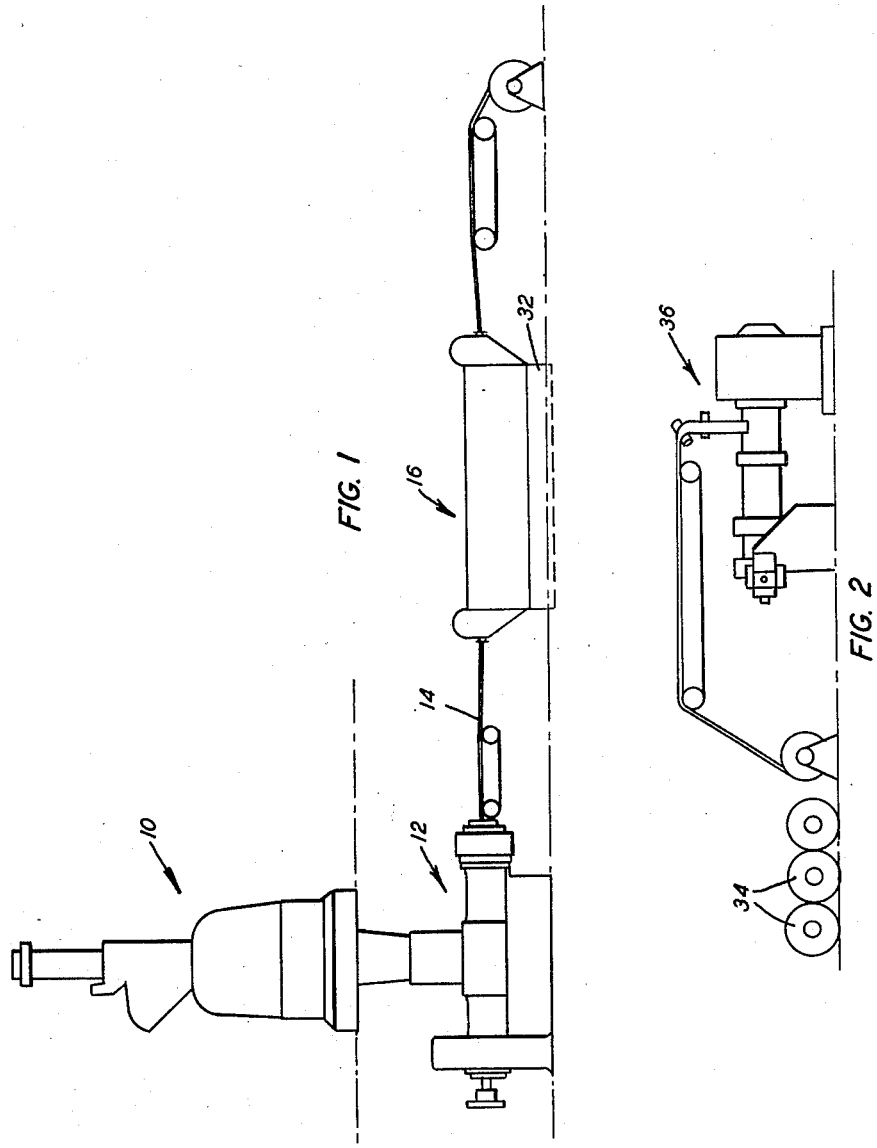

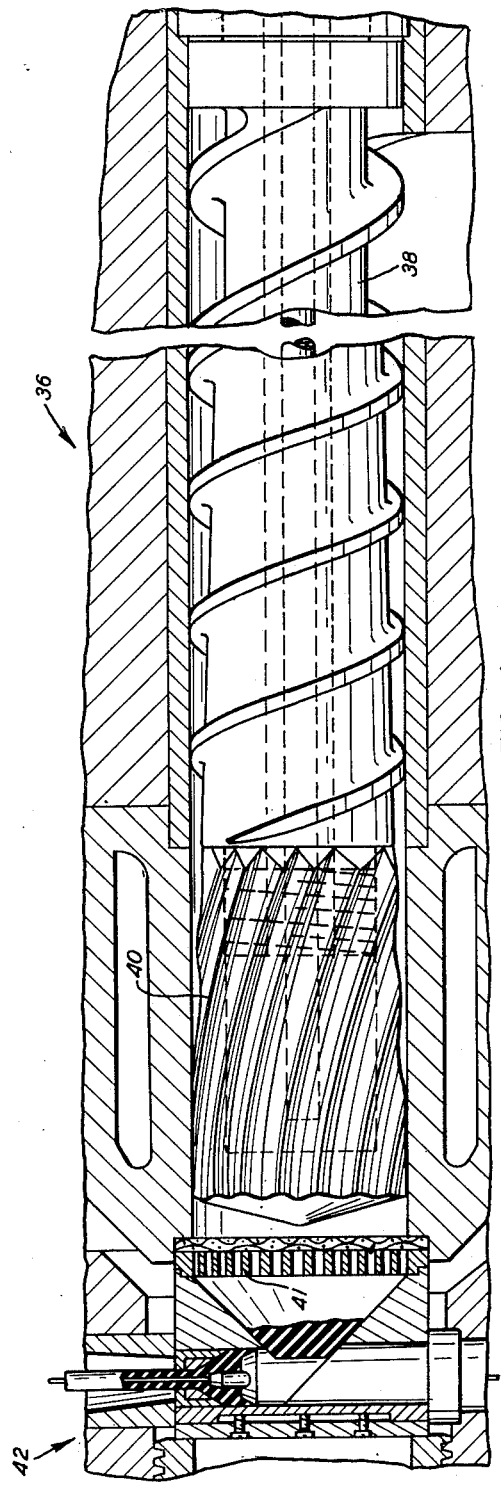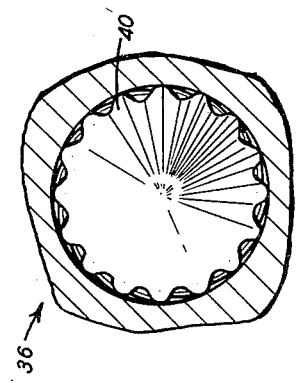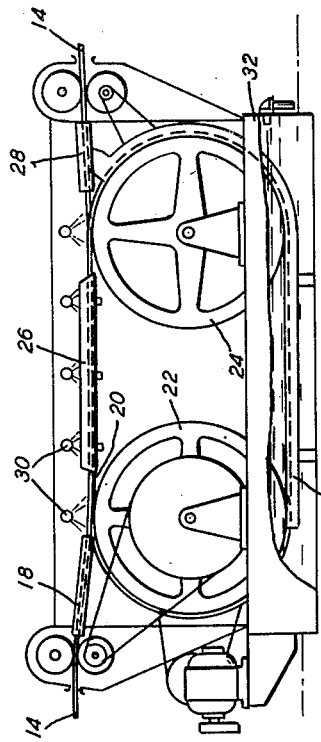

2,615,205

UNITED STATES PATENT OFFICE 2,615,205

METHOD OF PROCESSING VULCANIZABLE ELASTOMER COMPOUNDS

Alvin N. Gray, Edgewood, Md., assignor to Western Electric Company, Incorporated, New York, N. Y., a corporation of New York Application May 13, 1949, Serial No. 92,992

12 Claims. (Cl. 18—47.5)

1

This invention relates to methods of processing vulcanizable elastomer compounds, and more particularly to methods of preparing, extruding and curing vulcanizable elastomer compounds to form articles.

In the past in the manufacture of covered conductors having coverings composed of elastomer compounds, the ingredients of the compounds, except for the setting agent or accelerator were thoroughly mixed and worked in a Banbury mixer, or the like. Subsequent to the mixing and working and shortly before extrusion of the compound, any needed accelerators or vulcanizing agents were added to and mixed into the compounds on mills. The compounds were then conveyed to the extruders and extruded over the conductors.

This mixing of the accelerators or vulcanizing agents into the compounds also worked the compounds and heated the compounds to temperatures at which the compounds could be extruded satisfactorily by continuously extruding in any desired form including coverings around conductors. After the compounds were extruded over the conductors, the resulting coverings were subjected to heat and pressure to cure them. However, unless the hot compounds were extruded shortly after the vulcanizing agents were mixed therewith, the compounds would harden prior to the extrusion thereof. That is, they would set prior to the introduction thereof into extruders, or would set in the extruders prior to the formation of coverings therefrom. With the above-described method, it was difficult and somewhat uneconomical because of labor required in handling and scheduling of compound to keep flowing to the extruders a supply of the compound adequate to keep the extruders operating continuously and without scrap from preextrusion setting. Since the temperature and condition of the compound varied at the different times it was introduced into the extruder, accurate size control of the extruded product was very difficult.

In order to breakdown the elastomer components of vulcanizable elastomer compounds sufficiently to form high quality extruded products, it has been necessary, prior to introducing the compounds into extruders, to work the compounds a plurality of times starting from a cold state. Each compound had to be worked and mixed, starting with cold materials (i. e., materials at room temperatures), the compound cooled to around room temperature so that it was susceptible to breakdown and then reworked to

2 achieve the necessary plasticizing to place the compound in an extrudable condition before introducing it into an extruder for extrusion thereof into finished form. Such operations require much handling equipment, working and mixing equipment and time.

An object of this invention is to provide new and improved methods of processing vulcanizable elastomer compounds.

Another object of the invention is to provide new and improved methods of preparing, extruding and curing highly-accelerated, vulcanizable elastomer compounds to form articles.

A further object of the invention is to provide new and improved methods of completely mixing all ingredients of vulcanizable elastomer compounds prior to final forming of such compounds while eliminating premature curing of the compounds.

A method illustrating certain features of the invention may include working a highly accelerated, vulcanizable elastomer compound in a single operation to partially break down the compound, mixing a vulcanizing agent into the elastomer compound during said working thereof, cooling the compound to arrest vulcanization of the compound so that it can be stored without vulcanizing, extruding the compound, and working the compound as it is extruded to increase the extrudability thereof and to complete the breakdown thereof.

A complete understanding of the invention may be obtained from the following detailed description of methods forming specific embodiments thereof, when read in conjunction with the appended drawings, in which:

Fig. 1 is a schematic elevation of a portion of apparatus for practicing a method forming one embodiment of the invention;

Fig. 2 is a schematic elevation of another portion of the apparatus;

Fig. 3 is an enlarged, fragmentary, front elevation of a portion of the apparatus shown in Fig. 1;

Fig. 4 is an enlarged, horizontal section of another portion of the apparatus shown in Fig. 2, and Fig. 5 is an enlarged, vertical section of the portion of the apparatus shown in Fig. 4.

Referring now in detail to the drawings, all the ingredients of a highly accelerated elastomer compound, for example, a neoprene (polymerized chloroprene) jacketing compound, a natural rubber compound, a Buna-S (copolymeric butadiene and styrene) compound, or the like, are introduced in unmixed condition into a Banbury mixer 10 (Fig. 1) at roughly room temperature (around 70° F.). These ingredients in one particular neoprene jacketing compound are as follows:

| Ingredients | Parts by Weight |
| --- | --- |
| Neoprene | 46.58 |
| Piperidinium pentamethylene dithiocarbamate | .16 |
| Calcined magnesia | 2.12 |
| Carbon black | 19.86 |
| Clay | 17.23 |
| Zinc oxide (curing agent) | 4.64 |
| Plasticizers, softeners, oxidation retarders, waxes, etc. | 9.41 |
|  | 100.00 |

The mixer 10 works the mixture just sufficiently to incorporate the other ingredients of the compound with uniform dispersion into the neoprene. The compound is worked incidentally by this mixing to such an extent that it can be formed into a sheet or strip. The compound as it is worked in the mixer 10 is brought to a temperature above 200° F. and is kept below 250° F. to prevent curing thereof. The time of this mixing operation is kept below that at which appreciable curing would occur at the above-described operating temperature, and, for the example given, is usually less than ten minutes.

After the ingredients have been mixed in the mixer 10, the resulting compound, having its setting agent, zinc oxide, thoroughly mixed therewith, is dropped from the mixer into a strip-forming extruder 12. The extruder 12 is cooled to prevent overheating the compound, and forms the compound into a strip 14 for convenience in handling. The above-described mixing and strip extruding steps may be considered to be a single operation insofar as breakdown on the compound is concerned, and this operation effects roughly one-half of the breakdown needed for final extrusion of the compound into the form of a high quality, finished product. The mixer works the compound only to an extent necessary to disperse all the ingredients thereof uniformly in the compound, and any breakdown accomplished, while desirable, is only incidental to the mixing of the ingredients.

The strip 14 is hot as it emerges from the extruder 10, and is advanced immediately into and through a cooler 16 to cool the strip and arrest curing of the compound. An entrance guide 18 (Fig. 3) guides the strip to an endless cable 20, which travels partially around driven grooved rolls 22 and 24 in a roughly helical path. Grooved guide channels 26—26 guide the cable and the strip, which is fastened temporarily to the cable, from the entrance guide to an exit guide 28, and from one of the rolls 22 and 24 to the other. The strip leaves the cooler through the guide 28. Cold water is sprayed by sprayers 30—30 onto the portions of the strip in the upper portion of the cooler, while the lower portions of the strip are immersed in a tank 32 of cold water. The cold water quenches the strip to a temperature of around 70° F., at which temperature the strip may be kept for weeks without further appreciable curing even though it has a setting agent therein.

The strip 14 is run out of the cooler, and is coiled into pads 34—34 (Fig. 1). The pads are stored at room temperature until needed by one of a group of extruders, illustrated by an extruder 36, certain features of which are disclosed and claimed in copending applications Serial No. 709,498, filed November 13, 1946, by A. N. Gray for "Apparatus for Simultaneously Advancing and Plasticizing Plastic Material" (now abandoned); Serial No. 86,062, filed April 7, 1949, as a continuation-in-part of aforesaid application Serial No. 709,498, by A. N. Gray for "Method of and Apparatus for Simultaneously Advancing and Plasticizing Plastic Compounds" (now Patent 2,547,000 issued April 3, 1951); Serial No. 709,531, filed November 13, 1946, by G. E. Gliss for "Apparatus for Advancing and Working Plastic Material" (now abandoned); Serial No. 86,085, filed April 7, 1949, by G. E. Gliss for "Methods of and Apparatus for Advancing and Working Plastic Compounds"; and Serial No. 86,086, filed April 7, 1949, by G. E. Gliss and A. N. Gray for "Methods of and Apparatus for Working and Extruding Plastic Compounds into Article-Form."

The extruder 36 includes an elongated water-cooled, extruding screw 38 (Fig. 4) having a tapered root and a tapered, round-ribbed, water-cooled extension 40. The screw 38 and the extension 40 work the strip 14 thoroughly as it is introduced therein in a cold state, and break down the neoprene therein and heat it so that it is in optimum condition for smooth, uniform extrusion, and may be forced through a strainer 41 of the extruder without clogging the strainer, prevulcanizing or charring. About one-half of the total breakdown of the compound is accomplished by the screw and the extension. Heat and pressure are applied to the covering as it emerges from an extruding head 42 of the extruder 36 to cure the neoprene compound.

The temperature at which the neoprene compound enters the extruder 36 is around 70° F. (room temperature) so that the compound is very susceptible to work. The temperature of the compound as it is formed into the covering is about 250° F. so that the compound is beginnnig to cure just after extrusion.

The action of the mixer 10 (Fig. 1) is confined to the work necessary to thoroughly mix the ingredients of the compound, which together with the work done by the strip extruder 12 inherently effects roughly one-half of the total breakdown needed. The rest of the work is accomplished in the extruder 36 because the compound is advanced in thin ribbons through the extruder, which is cooled, while it is very difficult to cool the large mass of the compound in the mixer. That is, as much of the work as possible is accomplished in the extruder 36 in order that overheating of the compound be avoided, and the work in the mixer is restricted to that necessary for thorough mixing. Working the material in the extruder 36 effects the rest of the breakdown necessary for high quality extrusion, and makes the compound highly extrudable. Thus, with the method described hereinabove, the breakdown is achieved in both the mixing and extruding operations so that much time, equipment, handling and scrap are saved.

The above-described method of processing and extruding vulcanizable elastomer compounds avoids milling operations shortly prior to extrusion, which milling operations were necessary in the past because the vulcanizing agents had to be introduced into the compounds very shortly before extrusion to reduce prevulcanization or presetting of the compounds. By cooling the compound immediately after the vulcanizing agents are introduced therein, the compound may be stored at room temperature for weeks if necessary without appreciable setting thereof so that a high degree of flexibility of operation is provided. That is, the compound need not be made up immediately before its extrusion, and a supply of the compound may be maintained for the extruders so that the operations of the extruders need not be slowed or stopped for lack of compound. Furthermore, the compound may be formed continuously for extrusion without scrap from preextrusion vulcanization, even though surpluses are built up. Thus, the preextrusion processing operation in the method described hereinabove is much more efficient than those previously known, and there is no problem of keeping the temperatures of the compound sufficiently high for plasticity before introduction of the compound into the extruders. The compound may be delivered to the extruders without precautions to prevent cooling thereof, which precautions have been necessary in the methods of the prior art.

Since the compound is always introduced into the extruders at substantially the same temperature (room temperatures), uniformity of the extrusion operations can be obtained and substantially perfect size control is obtained without varying extrusion conditions, as is necessary when hot compounds are brought to extruders wherein it is impossible without great effort to keep the temperatures and extrudability of batches and portions of a single batch uniform. Furthermore, the compound is subjected to only a single working operation prior to introduction thereof into the extruder 36, and the compound is worked severely in these extruders to increase the breakdown thereof.

In the use of the term "highly accelerated" with reference to materials and compounds, or the like, in this specification and the claims, it is intended to designate compounds which will substantially cure not materially quicker than but within a period of the order of about one minute when in a generally annular form 0.050 inch thick in the wall thereof and subjected exteriorly to steam under a pressure of about 250 pounds per square inch, or conditions equivalent thereto.

In the use of the terms "elastomer" and "vulcanizable" with respect to materials and compounds, it is intended to include rubber and rubber-like materials, such as for example, neoprene and Buna-S.

What is claimed is:

1. The method of processing a highly accelerated, vulcanizable elastomer compound including a vulcanizable elastomer, a curing agent and other ingredients, which comprises working together in a mixer all the ingredients of such a compound only to the extent necessary to disperse the other ingredients in the elastomer and to effect a part of the breakdown necessary to make the compound smoothly and uniformly extrudable, then before incipient vulcanization occurs cooling the entire mass of the compound to room temperature, introducing the compound into an extruder at room temperature, continuously advancing the cooled compound in the extruder toward and through an article-forming die, severely working the compound in the extruder as it is advanced toward the die to effect the remainder of the breakdown necessary to make the compound smoothly and uniformly extrudable, and cooling the compound as it is thus worked to prevent overheating thereof and to maintain it in work-responsive condition.

2. The method of processing a highly accelerated, vulcanizable compound including polymerized chloroprene, a setting agent therefor, filler material and pigments, which comprises working together in a single operation all the ingredients of such a compound to the extent necessary to incorporate the other ingredients into the polymerized chloroprene but insufficiently to make the compound smoothly and uniformly extrudable, then before incipient vulcanization occurs quenching the entire mass of the compound sufficiently to arrest vulcanization thereof during prolonged storage, subsequently introducing the compound into an extruder at room temperature, continuously advancing the resulting cooled compound in the extruder toward and through an article-forming die, and working the compound in the extruder as it is advanced toward the die to effect the remainder of the work necessary to make the compound smoothly and uniformly extrudable.

3. The method of processing a highly accelerated, elastomer jacketing compound including polymerized chloroprene as its essential elastomer constituent, zinc oxide as the setting agent therefor and filler material, which comprises working together in a single mixing operation all the ingredients of such a compound to the extent necessary to disperse the setting agent and filler material through the elastomer and to effect only a part of the breakdown of the elastomer necessary to permit the resulting compound to be smoothly and uniformly extruded, extruding the resulting mixture into a strip, maintaining the compound during said working, mixing and strip extruding operations at a temperature below that a which incipient curing occurs, immediately thereafter cooling the compound strip to room temperature, feeding the cool strip into an extruder continuously advancing the compound in the extruder toward and through an article-forming die, severely working the compound in the extruder as it is advanced toward the die to effect the remainder of the work necessary to make the compound smoothly and uniformly extrudable, and cooling the compound as it is thus worked to prevent overheating thereof and to maintain it in work-responsive condition.

4. The method of processing a highly accelerated, heat-curable, polymerized chloroprene jacketing compound including a setting agent, which comprises introducing into a mixer all the ingredients of such a compound, working and mixing the ingredients of the compound in the mixer to such an extent that a substantial portion of the breakdown needed for proper extrudability is obtained, forming the compound into a strip immediately after it has been worked and mixed, promptly chilling the resulting strip sufficiently to arrest curing of the compound during storage thereof, holding the strip at room temperature, introducing the strip at room temperature into an extruder, simultaneously working the compound in the extruder until the rest of the breakdown needed for smooth and uniform extrusion thereof is achieved, straining the compound in the extruder and extruding the compound, and then curing the extruded product.

5. The method of processing highly accelerated, vulcanizable elastomer compounds including vulcanizing agents and fillers and having as the essential vulcanizable constituent thereof a rubbery elastomer of the group consisting of polymerized chloroprene, natural rubber and copolymers of butadiene and styrene, which comprises mixing all the ingredients of such a compound in a single operation, working the compound simultaneously with the mixing to only partially break down the elastomer in the compound as it is mixed, then before incipient vulcanization occurs cooling the entire mass of the compound sufficiently to arrest vulcanization during storage of the compound, subsequently introducing the compound at room temperature into an extruder, simultaneously working the compound in the extruder to complete the breakdown needed for smooth and uniform extrusion thereof and extruding the compound into finished article form.

6. The process of forming a covering around a conductive core of a highly accelerated, vulcanizable elastomer compound including a vulcanizable diolefine polymer as the essential elastomer constituent, filler material and a curing agent, which comprises introducing the ingredients of such a compound into a mixer, simultaneously mixing said ingredients together and working the same in the mixer sufficiently to partially break down the elastomer, passing the mixed and worked compound directly from the mixer to an extruder, extruding the compound from the extruder in the form of a continuous length of compound, immediately cooling the length of compound sufficiently to arrest vulcanization during prolonged storage thereof, introducing the length of compound into an extruder in its cooled condition, passing a conductive core through the extruder, sequentially working each increment of the compound in the extruder sufficiently to cause it to be readily extrudable and extruding it into a covering around the core, and vulcanizing the resulting covering on the core.

7. The method of processing highly accelerated, heat-curable elastomer compounds, which comprises introducing into a mixer all the ingredients of such a compound including a diolefine polymer as its essential elastomer constituent and a setting agent therefor, working and mixing the ingredients of the compound in the mixer to effect a portion of the breakdown needed to produce an easily extrudable compound, extruding the resulting mixture into a strip, maintaining the compound during said working, mixing and strip extruding operations at a temperature below that at which incipient curing occurs, promptly cooling the strip sufficiently to prevent it from curing during a prolonged period of storage, subsequently introducing the cooled strip into an extruder, and simultaneously working the compound in the extruder sufficiently to effect the rest of the breakdown needed for smooth and uniform extrusion thereof and extruding the compound in finished article form.

8. The method of processing a highly accelerated, heat-curable elastomer compound including a diolefine polymer as its essential elastomer constituent and a setting agent therefor, which comprises introducing into a mixer all the ingredients of such a compound, mixing and working the ingredients of the compound in the mixer sufficiently to partially break down the elastomer, passing the resulting mixed and worked compound directly from the mixer into an extruder, extruding the compound into a strip, the work performed on the compound during said working, mixing and extruding operations being sufficient to effect approximately one-half of the breakdown needed to produce an easily extrudable compound, immediately cooling the strip to a temperature at which no curing thereof occurs, introducing the cooled strip into an extruder, and simultaneously working the compound in the extruder sufficiently to effect the rest of the breakdown needed for smooth and uniform extrusion thereof and extruding the compound in finished article form.

9. The method of processing a highly accelerated, heat-curable elastomer compound including a vulcanizable diolefine polymer as its essential elastomer constituent and a curing agent, which comprises introducing into a mixer all the ingredients of such a compound, mixing and working the ingredients of the compound in the mixer sufficiently to partially break down the elastomer, passing the resulting mixed and worked compound directly from the mixer into an extruder, extruding the compound into a strip, the work performed on the compound during said working, mixing and extruding operations being sufficient to effect approximately one-half of the breakdown needed to produce an easily extrudable compound, immediately advancing the compound strip into a cooler, subjecting the compound strip to sufficient cold water in the cooler to cool it to about room temperature, storing the compound strip, subsequently introducing the compound strip into an extruder at room temperature, and simultaneously working the compound in the extruder sufficiently to effect the rest of the breakdown needed for smooth and uniform extrusion thereof and extruding the compound in finished article form.

10. The method of processing highly accelerated, heat-curable elastomer compounds, which comprises introducing into a mixer all the ingredients of such a compound including as the essential elastomer constituent thereof a rubbery elastomer of the group consisting of polymerized chloroprene, natural rubber and copolymers of butadient and styrene, working and mixing the ingredients of the compound in the mixer to effect a portion of the breakdown needed to produce an easily extrudable compound, extruding the resulting mixture into a strip, maintaining the compound during said working, mixing and strip extruding operations at a temperature below that at which incipient curing occurs, promptly cooling the strip sufficiently to prevent it from curing during a prolonged period of storage, subsequently introducing the cooled strip into an extruder, and simultaneously working the compound in the extruder sufficiently to effect the rest of the breakdown needed for smooth and uniform extrusion thereof and extruding the compound in finished article form.

11. The method of processing highly accelerated, heat-curable, polymerized chloroprene compounds, which comprises introducing into a mixer all the ingredients of such a compound including a setting agent, working and mixing the ingredients of the compound in the mixer to effect a portion of the breakdown needed to produce an easily extrudable compound, extruding the resulting mixture into a strip, maintaining the compound during said working, mixing and strip extruding operations at a temperature below that at which incipient curing occurs, promptly cooling the strip sufficiently to prevent it from curing during a prolonged period of storage, subsequently introducing the cooled strip into an extruder, and simultaneously working the compound in the extruder sufficiently to effect the rest of the breakdown needed for smooth and uniform extrusion thereof and extruding the compound in finished article form.

12. The method of processing a highly accelerated, heat-curable, polymerized chloroprene, jacketing compound including a curing agent, which comprises introducing into a Banbury mixer all the ingredients of such a compound, mixing and working the ingredients of the compound in the mixer for a period not materially exceeding about 10 minutes, passing the resulting mixed and worked compound directly from the mixer into an extruder, extruding the compound into a strip, the work performed on the compound during said working, mixing and extruding operations being sufficient to effect only a part of the breakdown needed to produce an easily extrudable compound, immediately advancing the compound strip into a cooler, subjecting the compound strip to sufficient cold water in the cooler to cool it to about room temperature, holding the compound strip at room temperature, subsequently introducing the compound strip into an extruder at room temperature, passing an elongated conductive core through the extruder, simultaneously working the compound in the extruder sufficiently to effect the rest of the breakdown needed for smooth and uniform extrusion thereof, straining the compound in the extruder and extruding the compound as a covering on the core, and vulcanizing the covering.

ALVIN N. GRAY.

REFERENCES CITED

The following references are of record in the file of this patent:

UNITED STATES PATENTS

| Number | Name | Date |
| --- | --- | --- |
| 2,093,501 | Williams | Sept. 21, 1937 |
| 2,291,212 | Clinefelter | July 28, 1942 |
| 2,496,147 | Brillhart | Jan. 31, 1950 |

OTHER REFERENCES

Gottlob, Tech. of Rubber 1927, pages 100, 105, 132 and 225. (Copy in Div. 15.)

Frazer, Report—42—3, September 1942, page 18, "The Neoprenes" Dupont.

Ind. and Chem. Eng., November 1942, p. 1311. (Copy in Scientific Library.)

Marchionna, Butalastic Polymers, pp. 415 and 482, 1946. (Copy in Scientific Library.)

Vanderbilt, 1948, pages 75 and 125. (Copy in Scientific Library.)